US012806886B2

(12) United States Patent
Pang et al.

(10) Patent No.: US 12,806,886 B2
(45) Date of Patent: Nov. 24, 2026

(54) SUSTAINABLE CELLULOSIC STRUCTURES FOR BARRIER APPLICATIONS

(71) Applicant: WestRock MWV, LLC, Atlanta, GA (US)

(72) Inventors: Jiebin Pang, Glen Allen, VA (US); Natarajan S. Ramesh, Midlothian, VA (US); Taylor A. Drucker, Glen Allen, VA (US)

(73) Assignee: WestRock MWV, LLC, Atlanta, GA (US)

( * ) Notice: Subject to any disclaimer, the term of this patent is extended or adjusted under 35 U.S.C. 154(b) by 149 days.

(21) Appl. No.: 18/430,752

(22) Filed: Feb. 2, 2024

(65) Prior Publication Data

US 2024/0262085 A1 Aug. 8, 2024

Related U.S. Application Data

(60) Provisional application No. 63/483,325, filed on Feb. 6, 2023.

(51) Int. Cl.

| | |
|---|---|
| ***B32B 23/08*** | (2006.01) |
| ***B32B 27/10*** | (2006.01) |
| ***B32B 27/20*** | (2006.01) |
| ***B32B 27/30*** | (2006.01) |
| ***B32B 27/32*** | (2006.01) |
| ***D21H 19/00*** | (2006.01) |
| ***D21H 19/38*** | (2006.01) |
| ***D21H 19/40*** | (2006.01) |
| ***D21H 19/58*** | (2006.01) |

(52) U.S. Cl.

CPC .............. *B32B 23/08* (2013.01); *B32B 27/10* (2013.01); *B32B 27/20* (2013.01); *B32B 27/302* (2013.01); *B32B 27/32* (2013.01); *D21H 19/385* (2013.01); *D21H 19/40* (2013.01); *D21H 19/58* (2013.01); *B32B 2250/05* (2013.01); *B32B 2250/40* (2013.01); *B32B 2255/12* (2013.01); *B32B 2255/26* (2013.01); *B32B 2307/7246* (2013.01); *B32B 2315/16* (2013.01); *B32B 2323/00* (2013.01); *B32B 2325/00* (2013.01); *B32B 2439/00* (2013.01)

(58) Field of Classification Search

None

See application file for complete search history.

(56) References Cited

U.S. PATENT DOCUMENTS

| | | | | |
|---|---|---|---|---|
| 7,235,308 | B2 | 6/2007 | Druckrey | |
| 9,028,921 | B2 | 5/2015 | Dandenault | |
| 9,200,409 | B2 | 12/2015 | Hartmann | |
| 9,950,502 | B2 | 4/2018 | Seyffer | |
| 9,994,999 | B2 | 6/2018 | Axrup | |
| 10,562,659 | B2 | 2/2020 | Fortin | |
| 10,590,606 | B2 | 3/2020 | Mongrain | |
| 10,829,894 | B2 | 11/2020 | Mongrain | |
| 11,242,461 | B2 | 2/2022 | Zha | |
| 11,299,855 | B2 | 4/2022 | Pang | |
| 11,377,251 | B2 | 7/2022 | Pang | |
| 2019/0257034 | A1 * | 8/2019 | Pang ...................... | D21H 19/60 |
| 2019/0291134 | A1 | 9/2019 | Mongrain | |
| 2020/0131708 | A1 | 4/2020 | Triclot | |
| 2020/0149222 | A1 | 5/2020 | Pang | |
| 2020/0263359 | A1 | 8/2020 | Zha | |
| 2021/0017717 | A1 | 1/2021 | Backfolk | |
| 2021/0025114 | A1 * | 1/2021 | Mongrain ................ | C09D 5/26 |
| 2021/0039498 | A1 | 2/2021 | Zeng et al. | |
| 2022/0016875 | A1 | 1/2022 | Fortin | |
| 2022/0162804 | A1 | 5/2022 | Nyflött | |
| 2022/0355979 | A1 | 11/2022 | Pang | |

OTHER PUBLICATIONS

PCTUS202414155 International Search Report dated Oct. 5, 2024.

* cited by examiner

*Primary Examiner* — Sheeba Ahmed

(74) *Attorney, Agent, or Firm* — Neil G. Cohen; Rohini K. Garg

(57) ABSTRACT

A cellulosic substrate includes a first major side and a second major side opposed from the first major side, a single polyolefin aqueous polymer dispersion barrier layer on the first major side of the cellulosic substrate, and at least one non-polyolefin aqueous polymer dispersion coating layer between the single polyolefin aqueous polymer dispersion barrier layer and the first major side of the cellulosic substrate.

20 Claims, 6 Drawing Sheets

SUSTAINABLE CELLULOSIC STRUCTURES FOR BARRIER APPLICATIONS

PRIORITY

This application claims priority from U.S. Ser. No. 63/483,325 filed on Feb. 6, 2023, the entire contents of which are incorporated herein by reference.

FIELD

This application is directed to the field of cellulosic structures and, more particularly, to recyclable cellulosic structures useful for barrier applications.

BACKGROUND

Sustainability is a key factor in developing new packages across various industries. Cellulose-based paper or paperboard is a more sustainable alternative to single-use plastic in packaging applications, but it often lacks necessary functionalities, including barrier functionalities, required for most packaging needs. Paper or paperboard laminated with aluminum foil, plastic film, or extrusion polymer can meet performance needs, but they are not easily repulpable and recyclable, raising environmental concerns. Aqueous coated paper or paperboard is generally considered repulpable and recyclable. However, its barrier performance may not match laminated paper or paperboard, and coating breakdown during repulping may cause stickies in recycled paper or paperboard, especially for high barrier aqueous coatings. High barrier aqueous coatings, including heat-sealable coatings, can also cause roll blocking due to the high polymer binder level and hot-tack required for heat-seal functionality.

Accordingly, those skilled in the art continue with research and development efforts in the field of recyclable cellulosic structures for barrier packaging applications.

SUMMARY

Disclosed are cellulosic structures.

In one example, the disclosed cellulosic structure includes a cellulosic substrate comprising a first major side and a second major side opposed from the first major side; a single polyolefin aqueous polymer dispersion barrier layer on the first major side of the cellulosic substrate; and at least one non-polyolefin aqueous polymer dispersion coating layer between the single polyolefin aqueous polymer dispersion barrier layer and the first major side of the cellulosic substrate.

Also disclosed are containers.

In one example, the disclosed container includes a cellulosic structure, wherein the cellulosic structure includes: a cellulosic substrate comprising a first major side and a second major side opposed from the first major side; a single polyolefin aqueous polymer dispersion barrier layer on the first major side of the cellulosic substrate; and at least one non-polyolefin aqueous polymer dispersion coating layer between the single polyolefin aqueous polymer dispersion barrier layer and the first major side of the cellulosic substrate.

Other examples of the disclosed cellulosic structures and containers will become apparent from the following detailed description, the accompanying drawings and the appended claims.

DETAILED DESCRIPTION

Figure 1:
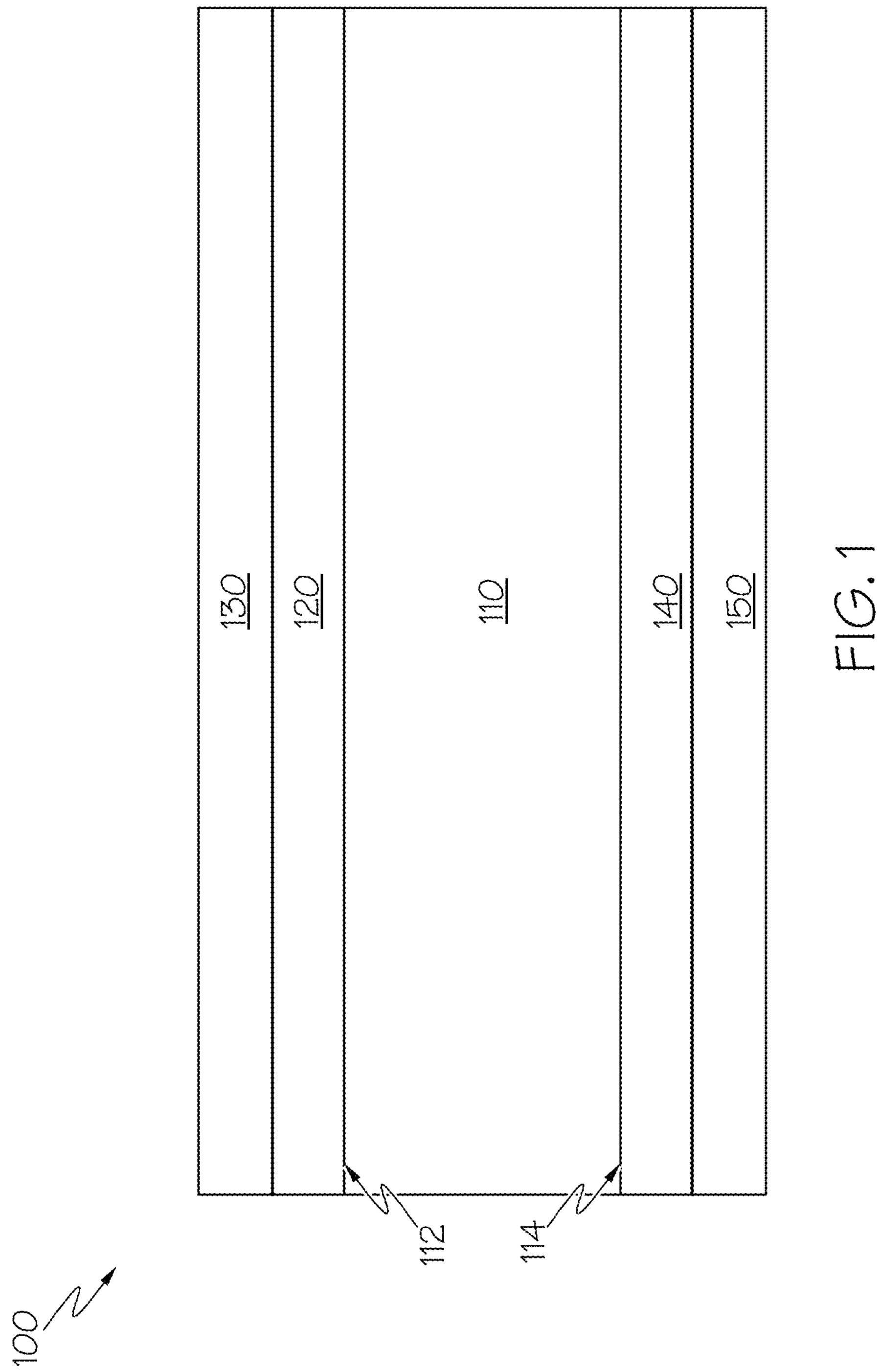
FIG. 1 illustrates an example of the cellulosic structure of the present description.

The sustainable packaging material described has a multi-functional cellulosic structure that provides barrier properties comparable to laminated or extrusion polymer coated paperboard. It is a sustainable alternative to single-use plastic packaging material, balancing functionality and sustainability. This invention enhances the stability of aqueous barrier coating with polyolefin dispersion and eliminates stickies in recyclability and roll blocking. The goal is to create a heat-sealable, repulpable, and recyclable cellulosic structure that effectively provides a barrier to oil, grease, water, and moisture vapor without causing roll blocking.

The cellulosic structure described has a cellulosic substrate with first and second major sides, a single polyolefin aqueous polymer dispersion barrier layer on the first major side, and at least one non-polyolefin aqueous polymer coating layer between it and the substrate. These layers offer high barrier properties against water, moisture vapor, oil, grease and allows for repulpability and recyclability. Optionally, the first major side may have additional coating layers and the second major side can be uncoated, coated with a barrier layer or non-barrier layer (e.g., printable coating layer), or have both. The second major side, if coated, may have the same or different layers as the first side. The cellulosic structure may be particularly suitable for forming a container including the cellulosic structure, in particular wherein the single polyolefin aqueous polymer dispersion barrier layer defines an interior surface of the container.

The cellulosic substrate used in cellulosic structures can be any cellulosic material suitable for coating with barrier layers, such as bleached or unbleached paper, paperboard, corrugating medium, and linerboard. The cellulosic substrate may have, for example, a basis weight of at least about 25 lb/3000 $ft^2$. By way of example, the cellulosic substrate may have a basis weight of 60-400 lb/3000 $ft^2$ (preferred: 80-300 lb/3000 $ft^2$) and a caliper thickness of 2-30 points (preferred: 11-18 points) for packaging purposes. A suitable cellulosic substrate is TruServ™ Poly Cupstock Solid Bleached Sulfate (SBS) basestock from WestRock. The cellulosic substrate can be made from cellulosic fibers, such as softwood, hardwood, or blends, and can be virgin or recycled. The average fiber length can vary, for example, in the range of 1-6 mm, 1.5-4 mm, or 2-3 mm, and may be determined by a refining process (mechanical or chemical). The single polyolefin aqueous polymer dispersion barrier layer is a water-based coating that improves the barrier properties of cellulosic structures, such as water, moisture vapor, oil, and grease, while maintaining non-blocking and repulpable functionality.

The single polyolefin aqueous polymer dispersion barrier layer can be made up of a polyolefin binder and a pigment, with clay as the primary pigment and a minimal amount of calcium carbonate. The polyolefin binder may be polyethylene (PE) and/or polypropylene (PP) with different density, molecular weight, molecular structure, or molecular weight distribution. The clay content in the pigment may be at least 50% by weight, with preferable percentages being at least 60%, at least 70%, at least 80%, at least 90%, at least 95%, at least 98%, and most preferably at least 99%. The calcium carbonate content may be less than 2% by weight, preferably less than 1% by weight, more preferably less than 0.5% by weight, more preferably less than 0.1% by weight. The use of clay as the primary pigment helps create a stable polyolefin/pigment formulation, while excessive calcium carbonate may cause detrimental gelling. The binder-to-pigment ratio is preferably 1:2 or higher and may be between 1:2 to 20:1, or 1:1.5 to 12:1, or 1:1 to 8:1. The dry coat weight, on a dry basis, of the polyolefin dispersion layer may be at least 0.5 lb/3000 $ft^2$, with a range of 0.5 lb/3000 $ft^2$ to 20 lb/3000 $ft^2$, and a preferred range of 1 lb/3000 $ft^2$ to 12 lb/3000 $ft^2$, or more preferably 2 lb/3000 $ft^2$ to 10 lb/3000 $ft^2$. Additionally, small amounts of pigments such as titanium dioxide, iron oxide, zinc oxide, mica, silicas, bentonite, montmorillonite clays, hollow sphere pigments, talc pigment, etc. may be included. The layer can be applied to paper using various techniques including blade, rod, air knife, bar, multi-head, roll, roll/blade, dip, cast, gravure, kiss, liquid application, reverse roll, curtain, spray, and printing press methods. The single polyolefin aqueous polymer dispersion barrier layer enhances the cellulosic structure's barrier properties and heat sealability while keeping its non-blocking and repulpable features. It can be applied using one or more coaters on the paper machine, using off-machine coater(s), or combining on- and off-paper machine coaters, with a blade coater being a specific and non-limiting example.

The non-polyolefin aqueous polymer dispersion basecoat layer includes a non-polyolefin binder and may contain a pigment. Binders can be styrene acrylic, styrene-butadiene, vinyl acrylic, polyester, polyvinyl alcohol, acrylic copolymer, polyvinyl acetate, carboxymethylcellulose, alginate, or starch. A preferred binder is styrene acrylic polymer. The binder may also be a blend of soft (glass transition temperature of less than 25° C.) and hard (glass transition temperature of more than 25° C.) binders for improved non-blocking functionality of the intermediate base-coated structure on one side or both sides. In an aspect, the weight percent of soft binder may be in a range of 1% to 99%, preferably 10% to 90%, more preferably 20% to 80%, more preferably 30% to 70%. The weight percent of hard binder may be in a range of 1% to 99%, preferably 10% to 90%, more preferably 20% to 80%, more preferably 30% to 70%. The pigment component can be clay, calcium carbonate, titanium dioxide, talc, or others. The binder-to-pigment ratio is typically 1:2 or lower and ranges from 1:20 to 1:2, 1:10 to 1:2.5, or 1:5 to 1:3. The layer is applied to paper with techniques such as blade, rod, air knife, bar, multi-head, roll, dip, cast, gravure, kiss, liquid application, reverse roll, curtain, spray, or printing press. The layer can be single or multiple layers, with a dry coat weight ranging from 0.5 lb/3000 $ft^2$ to 20 lb/3000 $ft^2$, with a preferred dry coat weight of 3-12 lb/3000 $ft^2$. The layer acts as a base coat for the high barrier polyolefin coating and allows for repulpability. The topcoat layer, made of a single polyolefin aqueous polymer dispersion, can be removed during repulping process. The basecoat layer can be applied using one or more coaters on the paper machine, using or as off-machine coater(s), or combining on- and off-paper machine coaters, with a blade coater being a specific and non-limiting example.

The cellulosic structure preferably has a 30-minute-water-Cobb rating of at most about 20 $g/m^2$, more preferably at most 10, more preferably at most 5, more preferably at most 4, more preferably at most 3, more preferably at most 2, more preferably at most 1.

The cellulosic structure preferably has a water vapor transmission rate of less than 500 grams per square meter per day at 38° C./90% RH, more preferably less than 400, more preferably less than 300, more preferably less than 200, more preferably less than 100.

The cellulosic structure preferably has a 3M kit test value is at least 7, more preferably at least 8, more preferably at least 9, more preferably at least 10, more preferably at least 11, more preferably at least 12.

The cellulosic structure preferably has a blocking rating of 2.0 or less, more preferably 1.5 or less, more preferably 1.0 or less, more preferably 0.5 or less, more preferably 0.2 or less, more preferably 0.1 or less.

Figure 2:
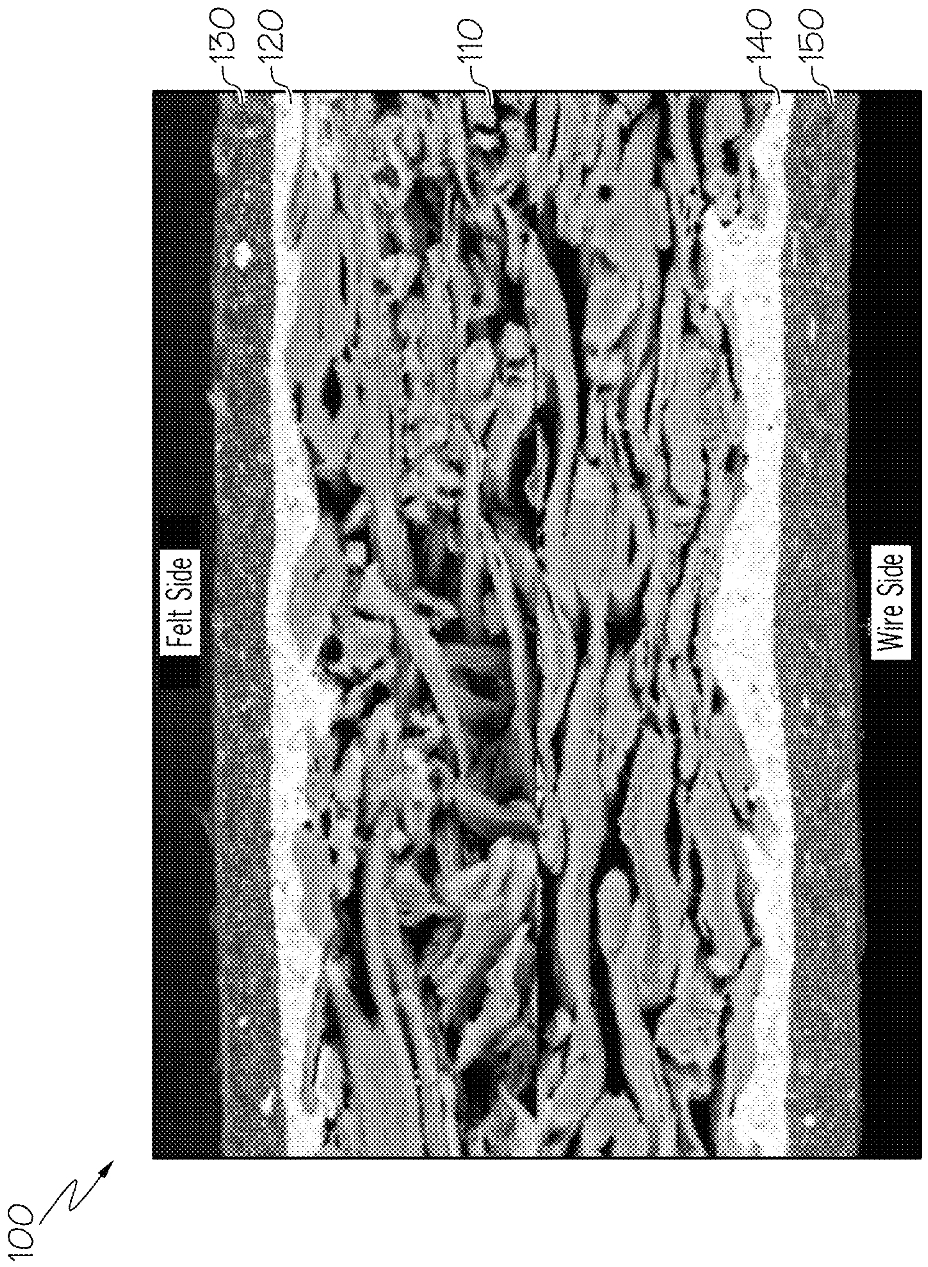
FIG. 2 is a representative SEM image of the exemplary cellulosic structure of FIG. 1.

The cellulosic structure is preferably repulpable to an extent that after repulping a percentage of accepts is at least 50%, more preferably at least 60%, more preferably at least 70%, more preferably at least 80%, more preferably at least 85%, FIG. 1 illustrates an example of the cellulosic structure. Referring to FIG. 1, an exemplary cellulosic structure 100 is a layered structure that includes a cellulosic substrate 110 having a first major side 112 and a second major side 114. A non-polyolefin aqueous polymer dispersion coating layer 120 is applied to the first major side 112 of the cellulosic substrate 110. A single polyolefin aqueous polymer dispersion barrier layer 130 is applied on the non-polyolefin aqueous polymer dispersion coating layer 120. The single polyolefin aqueous polymer dispersion barrier layer 130 defines an outermost surface of the cellulosic structure 100, which may preferably correspond to an interior surface of a container. An optional non-polyolefin aqueous polymer dispersion coating layer 140 is applied to the second major side 114 of the cellulosic substrate 110. A single polyolefin aqueous polymer dispersion barrier layer 150 is applied on the non-polyolefin aqueous polymer dispersion coating layer 140. The single polyolefin aqueous polymer dispersion barrier layer 150 defines an outermost surface of the cellulosic structure 100, which may preferably correspond to an exterior surface of a container. Optionally, the first major side may have additional coating layers and the second major side can be uncoated, or coated with a different barrier layer or a non-barrier layer (e.g., printable coating layer), or have both. FIG. 2 illustrates a representative SEM image showing the 4 layers of coatings (2-layer each side) of the exemplary cellulosic structure of FIG. 1.

EXPERIMENTAL EXAMPLES

Table 1 shows different raw materials used in coating formulations of the present description.

TABLE 1

| | Product | Description |
|---|---|---|
| Pigment CC | HYDROCARB ® 90 (Omya AG, Oftringen, Switzerland) | fine ground $CaCO_3$ (particle size 90% <2 micron) |
| Pigment CL | HYDRAFINE ® 90W (KaMin LLC of Macon, Georgia) | kaolin clay No. 1 ultrafine clay |

TABLE 1-continued

| | | Product | Description |
|---|---|---|---|
| Binder | SA-1 | CARTASEAL ® SCR (Archroma, Reinach, Switzerland) | water based styrene-acrylic emulsion polymer (Tg 30° C.) |
| Binder | SA-2 | RHOPLEXTM ™ C-340 (The Dow Chemical Company, Michigan) | water based styrene-acrylic emulsion polymer (Tg 8° C.) |
| Binder | POD | RHOBARR ™ 325 Polyolefin Barrier Dispersion (The Dow Chemical Company, Michigan) | aqueous acid-modified polyolefin dispersion, 47 ± 2.0% solids |

Table 2 shows coating formulations for lab experiments performed on pigment compatibility with polyolefin dispersion binders.

TABLE 2

| | Formulation (in Parts) | | | | | | | | |
|---|---|---|---|---|---|---|---|---|---|
| | F1-CC | F2-CC | F1-CL | F2-CL | F3-CL | F4-CL | F1-CC/CL | F2-CC/CL | F3-CC/CL |
| $CaCO_3$ (CC) | 100 | 100 | | | | | 1 | 2.5 | 5 |
| Clay (CL) | | | 100 | 100 | 100 | 100 | 99 | 97.5 | 95 |
| Binder (POD) | 800 | 400 | 800 | 400 | 200 | 100 | 900 | 800 | 800 |

Figure 3:
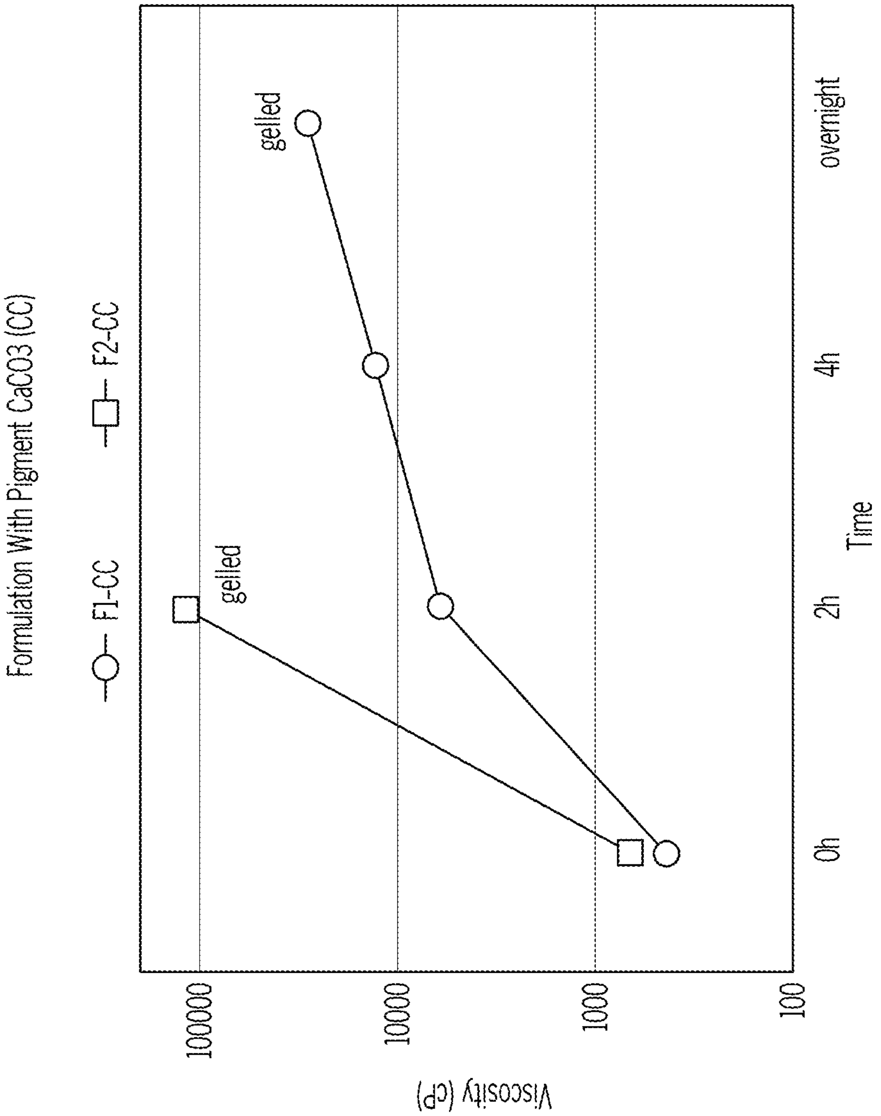
FIG. 3 illustrates rheology vs. time results for polyolefin dispersion coating formulations comprising calcium carbonate (CC) pigments.

FIG. 3 illustrates rheology vs. time results for polyolefin dispersion coating formulations comprising calcium carbonate pigments. For coating formulations with $CaCO_3$ (CC) pigments, the results showed significant increase of viscosity with time for both F1-CC (800 parts binder) and F2-CC (400 parts binder), which gelled in 2 hours and overnight, respectively.

Figure 4:
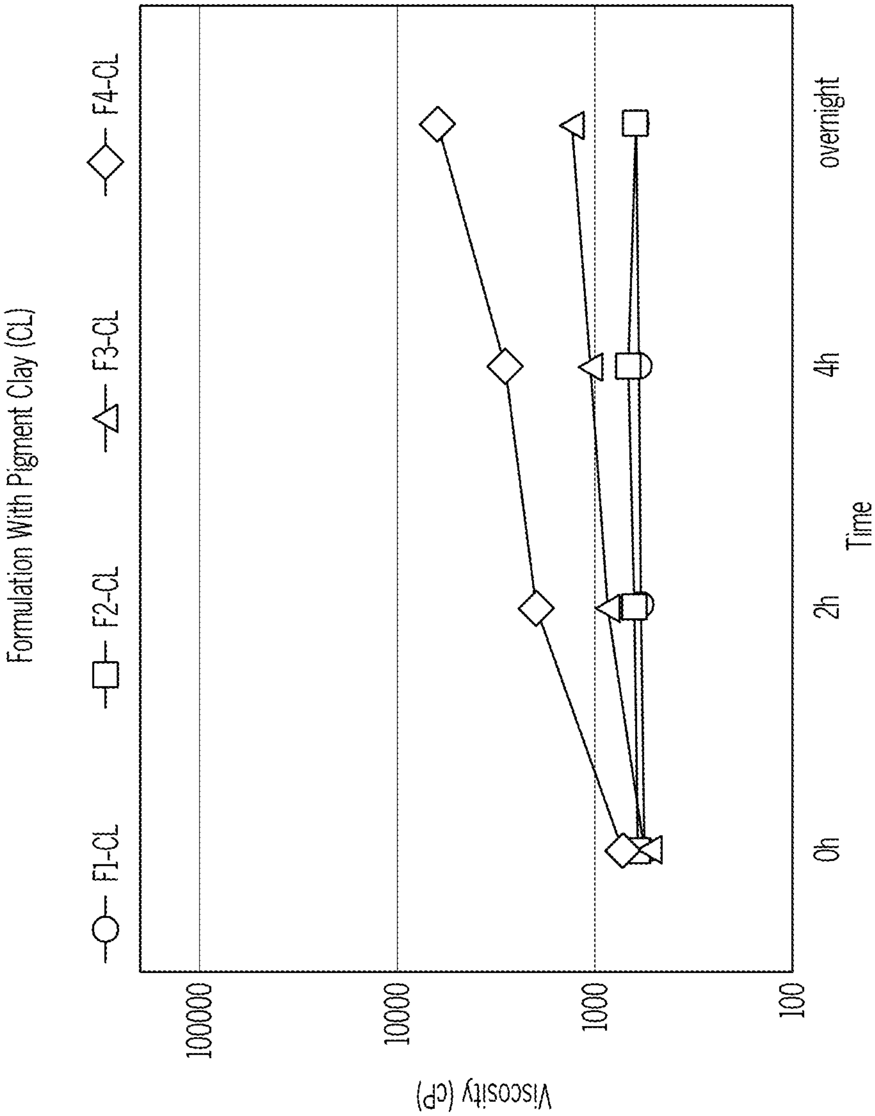
FIG. 4 illustrates rheology vs. time results for polyolefin dispersion coating formulations comprising clay (CL) pigments.

FIG. 4 illustrates rheology vs. time results for polyolefin dispersion coating formulations comprising clay pigments. For coating formulations with clay (CL) pigment, the results showed stable rheology for formulations F1-CL (800 parts binder) and F2-CL (400 parts binder), and only some increase of viscosity with time for formulation F3-CL (200 parts binder) and F4-CL (100 parts binder).

Figure 5:
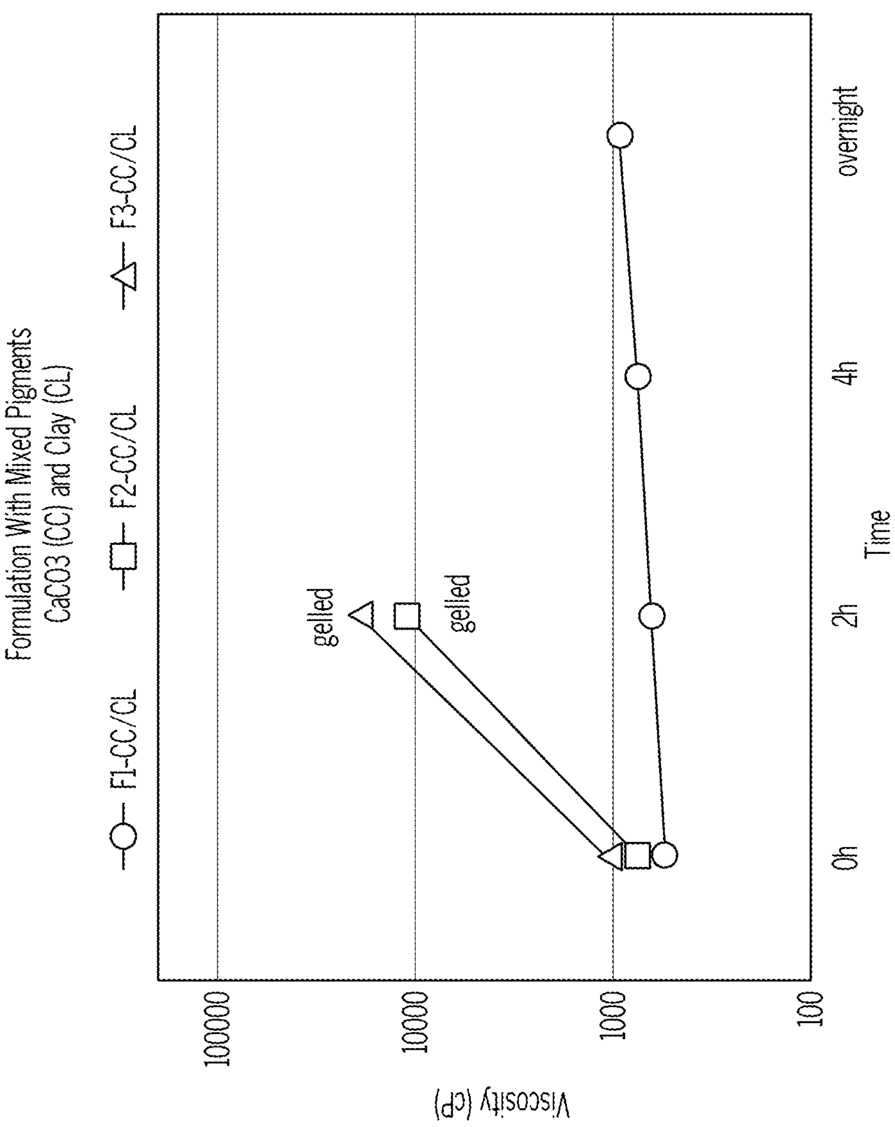
FIG. 5 illustrates rheology vs. time results for polyolefin dispersion coating formulations comprising mixed pigments of $CaCO_3$ (CC) and clay (CL) pigment.

FIG. 5 illustrates rheology vs. time results for polyolefin dispersion coating formulations comprising mixed pigments of $CaCO_3$ (CC) and clay (CL) pigment. For coating formulations with mixed pigments of $CaCO_3$ (CC) and Clay (CL) pigment, the results showed relatively stability with only slight increase of viscosity with time for formulation F1-CC/CL (900 parts binder, CC/CL 1/99); however, the results showed significantly increased viscosity with time for both F2-CC/CL (800 parts binder, CC/CL 2.5/97.5) and F3-CC/CL (800 parts binder, CC/CL 5/95), which gelled in 2 hours.

Table 3 shows the formulations for base coatings and barrier top coatings coated on cellulosic substrates. For the substrate and coating method, the cellulosic substrate was TruServ™ Poly Cupstock SBS basestock, 13 pt (150 lb/3000F2), or 16.5 pt (175 lb/3000F2), from WestRock. Both sides of the paperboard were coated with the base coat and barrier top coating on a blade coater.

TABLE 3

| Formulation (in Parts) | Base Coat | Barrier Coat |
|---|---|---|
| $CaCO_3$ (CC) | 50 | |
| Clay (CL) | 50 | 100 |
| Binder (SA-1) | 20 | |
| Binder (SA-2) | 20 | |
| Binder (POD) | | 500 |

Table 4 shows coating details and properties for the coated cellulosic substrates produced in connection with Table 3.

TABLE 4

| | Sample ID | | | | | | | | | |
|---|---|---|---|---|---|---|---|---|---|---|
| | A | | B | | C | | D | | E | |
| | Substrate | | | | | | | | | |
| | 13 pt TruServ | | 16.5 pt TruServ | | 16.5 pt TruServ | | 16.5 pt TruServ | | 16.5 pt TruServ | |
| | Side Coated | | | | | | | | | |
| | Felt Side | Wire Side | Felt Side | Wire Side | Felt Side | Wire Side | Felt Side | Wire Side | Felt Side | Wire Side |
| Base Coat Weight (1b/3000F2) | 4.7 | 4.9 | 7.6 | 7.3 | 7.6 | 7.3 | 7.6 | 7.3 | 7.6 | 7.3 |
| Barrier Coat Weight (lb/3 msf) | 7.5 | 7.8 | 2.7 | 7.9 | 3.9 | 7.9 | 5.5 | 7.9 | 5.7 | 7.9 |

TABLE 4-continued

| | Sample ID | | | | | | | | | |
|---|---|---|---|---|---|---|---|---|---|---|
| | A | | B | | C | | D | | E | |
| | Substrate | | | | | | | | | |
| | 13 pt TruServ | | 16.5 pt TruServ | | 16.5 pt TruServ Side Coated | | 16.5 pt TruServ | | 16.5 pt TruServ | |
| | Felt Side | Wire Side | Felt Side | Wire Side | Felt Side | Wire Side | Felt Side | Wire Side | Felt Side | Wire Side |
| H2O Cobb (g/m2, 30 min) | 1.5 | 1.1 | 1.5 | | 1.1 | | 1.2 | 0.8 | 1.5 | |
| WVTR (g/m2/d, 38° C./ 90% RH) | 91.8 | | 112.5 | | 99.4 | | 92.9 | | 90.5 | |
| 3M Kit | 12 | 12 | | | | | 12 | 12 | | |
| PPS (micron) | | 2.65 | | | | | | 2.95 | | |
| Static COF (MD) | 0.61 | | 0.60 | | 0.61 | | 0.64 | | 0.64 | |
| Static COF (CD) | 0.61 | | 0.61 | | 0.67 | | 0.60 | | 0.64 | |
| Blocking | 0.2 | | 0.0 | | 0.0 | | 0.0 | | 0.2 | |
| Repulpability (% fiber accepts) | 86 | | 87 | | 87 | | 85 | | 84 | |

The Cobb test is used to evaluate the water barrier of coatings by measuring the amount of water absorbed after 30 minutes, expressed in g/m$^2$. The test is performed according to TAPPI Standard T441 om-04 and uses 23° C. water.

The WVTR (water vapor transmission rate) test measures the properties of a material's water vapor barrier, expressed in g/m$^2$/d. The test is performed at 38° C. and 90% relative humidity according to TAPPI Standard T464 OM-12.

The Coefficient of Friction (COF) test was performed using a Hanatek Advanced Friction Tester, according to TAPPI standard T-549. Samples were cut to 2.5 inch by 2.5 inch for top samples and 4 inch by 8.5 inch for bottom samples. Both static COF and dynamic COF were recorded in both machine-direction (MD) and cross-direction (CD) with the first side against the second side of the coated substrate.

Parker Print-Surf (PPS) roughness was measured according to TAPPI standard T555. TAPPI standard T555 provides a method for measuring the roughness of a surface. The measurement is used to evaluate the roughness of various materials, including coated substrates.

The oil and grease resistance (OGR) of the samples was measured using the 3M kit test according to TAPPI Standard T559 cm-02. The test measures the resistance of a material to oil and grease penetration, with ratings ranging from 1 (least resistance) to 12 (excellent resistance). The measurement was taken on the "coated side" of the samples.

The blocking test is a method to evaluate the tackiness or adhesion between the barrier coated, first major side and the uncoated or coated, second major side of paperboard samples. The test is performed by cutting the paperboard into 2-inch by 2-inch square samples and stacking several duplicates. The stack is placed in a testing device (FIG. 6, item 200) that applies a force of 100 lbf (100 psi) to the samples and is then placed in an oven at 50° C. for 24 hours. After the test, the samples are evaluated for tackiness and blocking damage, which is visible as fiber tear or damage to the print coating. The blocking test is rated from 0 to 4, with 0 indicating no blocking (i.e., samples fall apart without force), 1 indicating light tackiness without fiber tear, 2 indicating high tackiness without fiber tear, 3 indicating stickiness with up to 25% fiber tear or coat damage (area basis), and 4 indicating more than 25% fiber tear or coat damage. The blocking rating was tested at 50° C./100 psi/24 hrs for all examples.

Figure 6:
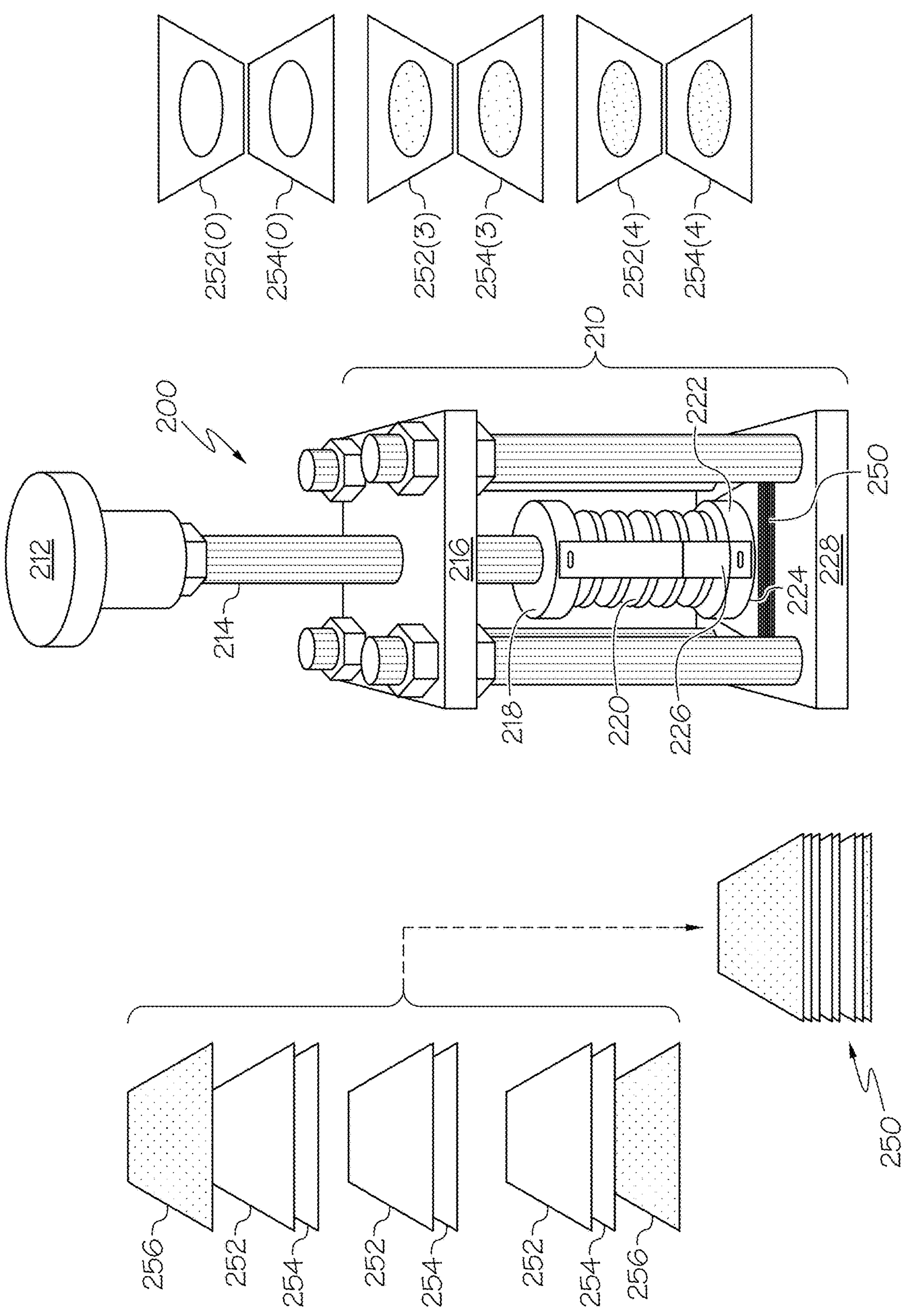
FIG. 6 illustrates a simplified representation of a blocking test of the present description.

FIG. 6 provides a simplified illustration of the blocking test. The paperboard samples (252, 254) are cut into 2-inch by 2-inch squares and positioned with the barrier-coated side of one piece (252) contacting the uncoated side of the other piece (254). The pairs are stacked (250) with a spacer (256) between them, which can be foil, release paper, or copy paper. The entire sample stack is placed into the testing device (200), which includes a frame (210), an adjustment knob (212) attached to a screw (214), a plate (218) bearing upon a heavy coil spring (220), and a plate (222) with a one-square-inch lower surface (224). A scale (226) allows the user to read the applied force, which can be 100 lbf (100 psi). The stack is placed between the lower surface (224) and the frame bottom (228), and the knob (212) is tightened until the desired force is reached. The entire device including samples is then placed in an oven at 50° C. for 24 hours, removed from the test environment and cooled to room temperature, and the pressure is released.

The samples are evaluated for tackiness and blocking by separating each pair of paperboard sheets. Blocking damage is visible as fiber tear, which usually occurs on the non-barrier surface of sample (254), or damage to the print coating if present.

FIG. 6 provides examples of blocking ratings, with samples 252(0)/254(0) representing a "0" rating (no blocking), 252(3)/254(3) representing a "3" rating with up to 25% fiber tear, and 252(4)/254(4) representing a "4" rating with more than 25% fiber tear. The circular shapes in the samples indicate the approximate area that was under pressure, for example, about one square inch. The depictions in FIG. 6 are meant to approximately suggest the percent damage, rather than show a realistic appearance of the samples.

The repulpability of coated paperboard was tested using the AMC Maelstom Repulper, Warring Blender, and British Disintegrator. 25 grams of paperboard strips, 1¼ in by 4 in, were added to 1500 mL of water (pH 6.5±0.5, 125° F.±100° F.). The mixture was blended for 4 minutes in a Warring blender, rinsed by 500 mL of water to remove excess fibers, and then the total mixture (2000 mL) was processed in a British disintegrator for 5 minutes at 3000 rpm. The resulting slurry was screened through a vibrating flat screen (0.010-inch slot size) for 20 minutes. The fibers (accepts) that passed through the screen and the rejects caught by the screen were collected, dried, and weighed. The percentage of repulpability was calculated based on these weights of accepts and rejects, with 100% indicating complete repulpability.

It was discovered in above lab experiment studies that stable formulations could be formed from the polyolefin dispersion, with clay as the primary pigment and a minimal amount of calcium carbonate. Then, cupstock paperboard was coated with a repulpable aqueous base coat on each side and an aqueous barrier top coat containing polyolefin and clay on each side. The coated paperboard had excellent barrier properties, especially water barrier, was repulpable, and did not show any tendency of blocking. Cup containers with barrier coating on both sides were successfully made with the coated paperboard.

Further, the disclosure comprises examples according to the following clauses:

Clause 1. A cellulosic structure comprising: a cellulosic substrate comprising a first major side and a second major side opposed from the first major side; a single polyolefin aqueous polymer dispersion barrier layer on the first major side of the cellulosic substrate; and at least one non-polyolefin aqueous polymer dispersion coating layer between the single polyolefin aqueous polymer dispersion barrier layer and the first major side of the cellulosic substrate.

Clause 2. The cellulosic structure of Clause 1 wherein the cellulosic substrate comprises paperboard.

Clause 3. The cellulosic structure of Clause 2 wherein the paperboard comprises solid bleached sulfate paperboard.

Clause 4. The cellulosic structure of any preceding clause wherein the cellulosic substrate has a basis weight of at least about 25 lb/3000 $ft^2$.

Clause 5. The cellulosic structure of any preceding clause wherein the cellulosic substrate has a basis weight ranging from about 60 lb/3000 $ft^2$ to about 400 lb/3000 $ft^2$.

Clause 6. The cellulosic structure of any preceding clause wherein the cellulosic substrate has a basis weight ranging from about 80 lb/3000 $ft^2$ to about 300 lb/3000 $ft^2$.

Clause 7. The cellulosic structure of any preceding clause wherein the cellulosic substrate has a caliper ranging from about 2 points to about 30 points.

Clause 8. The cellulosic structure of any preceding clause wherein the cellulosic substrate has a caliper ranging from about 11 points to about 18 points.

Clause 9. The cellulosic structure of any preceding clause wherein the single polyolefin aqueous polymer dispersion barrier layer comprises a polyolefin binder.

Clause 10. The cellulosic structure of Clause 9 wherein the single polyolefin aqueous polymer dispersion barrier layer further comprises a pigment.

Clause 11. The cellulosic structure of Clause 10 wherein the pigment comprises clay.

Clause 12. The cellulosic structure of Clause 10 wherein the pigment comprises clay, wherein a clay content in the pigment is at least 50% by weight.

Clause 13. The cellulosic structure of Clause 10 wherein the pigment comprises clay, wherein a clay content in the pigment is at least 60% by weight.

Clause 14. The cellulosic structure of Clause 10 wherein the pigment comprises clay, wherein a clay content in the pigment is at least 70% by weight.

Clause 15. The cellulosic structure of Clause 10 wherein the pigment comprises clay, wherein a clay content in the pigment is at least 80% by weight.

Clause 16. The cellulosic structure of Clause 10 wherein the pigment comprises clay, wherein a clay content in the pigment is at least 90% by weight.

Clause 17. The cellulosic structure of Clause 10 wherein the pigment comprises clay, wherein a clay content in the pigment is at least 95% by weight.

Clause 18. The cellulosic structure of Clause 10 wherein the pigment comprises clay, wherein a clay content in the pigment is at least 98% by weight.

Clause 19. The cellulosic structure of Clause 10 wherein the pigment comprises clay, wherein a clay content in the pigment is at least 99% by weight.

Clause 20. The cellulosic structure of any one of Clauses 10-19 wherein the pigment comprises calcium carbonate, wherein the calcium carbonate content is less than 2% by weight.

Clause 21. The cellulosic structure of any one of Clauses 10-19 wherein the pigment comprises calcium carbonate, wherein the calcium carbonate content is less than 1% by weight.

Clause 22. The cellulosic structure of any one of Clauses 10-19 wherein the pigment comprises calcium carbonate, wherein the calcium carbonate content is less than 0.5% by weight.

Clause 23. The cellulosic structure of any one of Clauses 10-19 wherein the pigment comprises calcium carbonate, wherein the calcium carbonate content is less than 0.1% by weight.

Clause 24. The cellulosic structure of any one of Clauses 10-23 wherein a ratio of the polyolefin binder to the pigment is at least 1 to 2.

Clause 25. The cellulosic structure of any preceding clause wherein the single polyolefin aqueous polymer dispersion barrier layer has a coat weight, on a dry basis, of at least about 0.5 lb/3000 $ft^2$.

Clause 26. The cellulosic structure of any preceding clause wherein the at least one non-polyolefin aqueous polymer dispersion coating layer comprises a non-polyolefin binder.

Clause 27. The cellulosic structure of Clause 26 wherein the non-polyolefin binder comprises at least one of styrene acrylic, styrene-butadiene, vinyl acrylic, polyester, and polyvinyl alcohol.

Clause 28. The cellulosic structure of Clause 26 or Clause 27 wherein the non-polyolefin binder comprises a blend of soft binder having a glass transition temperature of less than 25° C. and hard binder having a glass transition temperature of more than 25° C.

Clause 29. The cellulosic structure of any one of Clauses 26-28 wherein the at least one non-polyolefin aqueous polymer dispersion coating layer further comprises a pigment.

Clause 30. The cellulosic structure of Clause 29 wherein the pigment comprises at least one of a clay and a calcium carbonate.

Clause 31. The cellulosic structure of Clause 29 or Clause 30 wherein a ratio of the non-polyolefin binder to the pigment is at most 1 to 2.

Clause 32. The cellulosic structure of any preceding clause wherein the at least one non-polyolefin aqueous polymer dispersion coating layer comprises multiple non-polyolefin aqueous polymer dispersion coating layers.

Clause 33. The cellulosic structure of any preceding clause wherein the non-polyolefin aqueous polymer dispersion coating layer has a coat weight, on a dry basis, of at least about 0.5 lb/3000 $ft^2$.

Clause 34. The cellulosic structure of any preceding clause wherein the second major side is uncoated.

Clause 35. The cellulosic structure of any one of Clauses 1-33 further comprising a barrier layer on the second major side.

Clause 36. The cellulosic structure of any one of Clauses 1-33 and 35 further comprising a non-barrier layer on the second major side.

Clause 37. The cellulosic structure of any one of Clauses 1-33, 35 and 36 further comprising a printable coating layer on the second major side.

Clause 38. The cellulosic structure of any one of Clauses 1-33 and 35-37 further comprising a single polyolefin aqueous polymer dispersion barrier layer on the second major side of the cellulosic substrate.

Clause 39. The cellulosic structure of any one of Clauses 1-33 and 35-38 further comprising at least one non-polyolefin aqueous polymer dispersion coating layer on the second major side of the cellulosic substrate.

Clause 40. The cellulosic structure of any one of Clauses 1-33 and 35-39 further comprising a single polyolefin aqueous polymer dispersion barrier layer on the second major side of the cellulosic substrate and at least one non-polyolefin aqueous polymer dispersion coating layer between the single polyolefin aqueous polymer dispersion barrier layer and the second major side of the cellulosic substrate.

Clause 41. The cellulosic structure of any preceding clause having a 30-minute-water-Cobb rating of at most about 20 $g/m^2$.

Clause 42. The cellulosic structure of any preceding clause having a 30-minute-water-Cobb rating of at most about 10 $g/m^2$.

Clause 43. The cellulosic structure of any preceding clause having a 30-minute-water-Cobb rating of at most about 5 $g/m^2$.

Clause 44. The cellulosic structure of any preceding clause having a 30-minute-water-Cobb rating of at most about 4 $g/m^2$.

Clause 45. The cellulosic structure of any preceding clause having a 30-minute-water-Cobb rating of at most about 3 $g/m^2$.

Clause 46. The cellulosic structure of any preceding clause having a 30-minute-water-Cobb rating of at most about 2 $g/m^2$.

Clause 47. The cellulosic structure of any preceding clause having a 30-minute-water-Cobb rating of at most about 1 $g/m^2$.

Clause 48. The cellulosic structure of any preceding clause having a water vapor transmission rate of less than 500 grams per square meter per day at 38° C./90% RH.

Clause 49. The cellulosic structure of any preceding clause having a water vapor transmission rate of less than 400 grams per square meter per day at 38° C./90% RH.

Clause 50. The cellulosic structure of any preceding clause having a water vapor transmission rate of less than 300 grams per square meter per day at 38° C./90% RH.

Clause 51. The cellulosic structure of any preceding clause having a water vapor transmission rate of less than 200 grams per square meter per day at 38° C./90% RH.

Clause 52. The cellulosic structure of any preceding clause having a water vapor transmission rate of less than 100 grams per square meter per day at 38° C./90% RH.

Clause 53. The cellulosic structure of any preceding clause having a 3M kit test value is at least 7.

Clause 54. The cellulosic structure of any preceding clause having a 3M kit test value is at least 8.

Clause 55. The cellulosic structure of any preceding clause having a 3M kit test value is at least 9.

Clause 56. The cellulosic structure of any preceding clause having a 3M kit test value is at least 10.

Clause 57. The cellulosic structure of any preceding clause having a 3M kit test value is at least 11.

Clause 58. The cellulosic structure of any preceding clause having a 3M kit test value is at least 12.

Clause 59. The cellulosic structure of any preceding clause having a blocking rating of 2.0 or less.

Clause 60. The cellulosic structure of any preceding clause having a blocking rating of 1.5 or less.

Clause 61. The cellulosic structure of any preceding clause having a blocking rating of 1.0 or less.

Clause 62. The cellulosic structure of any preceding clause having a blocking rating of 0.5 or less.

Clause 63. The cellulosic structure of any preceding clause having a blocking rating of 0.2 or less.

Clause 64. The cellulosic structure of any preceding clause having a blocking rating of 0.1 or less.

Clause 65. The cellulosic structure of any preceding clause wherein the cellulosic structure is repulpable to an extent that after repulping a percentage of accepts is at least 50%.

Clause 66. The cellulosic structure of any preceding clause wherein the cellulosic structure is repulpable to an extent that after repulping a percentage of accepts is at least 60%.

Clause 67. The cellulosic structure of any preceding clause wherein the cellulosic structure is repulpable to an extent that after repulping a percentage of accepts is at least 70%.

Clause 68. The cellulosic structure of any preceding clause wherein the cellulosic structure is repulpable to an extent that after repulping a percentage of accepts is at least 80%.

Clause 69. The cellulosic structure of any preceding clause wherein the cellulosic structure is repulpable to an extent that after repulping a percentage of accepts is at least 85%.

Clause 70. A container comprising the cellulosic structure of any preceding clause.

Clause 71. The container of Clause 70 in the form of a cup.

Although various examples of the disclosed cellulosic structures have been shown and described, modifications may occur to those skilled in the art upon reading the specification. The present application includes such modifications and is limited only by the scope of the claims.

What is claimed is:

1. A cellulosic structure comprising:

a cellulosic substrate comprising a first major side and a second major side opposed from the first major side;

a single polyolefin aqueous polymer dispersion barrier layer on the first major side of the cellulosic substrate, wherein the single polyolefin aqueous polymer dispersion barrier layer comprises a polyolefin binder and a pigment, wherein a binder-to-pigment ratio of the single polyolefin aqueous polymer dispersion barrier layer is between 1:2 to 20:1, wherein a calcium carbonate content in the pigment is less than 2% by weight; and at least one non-polyolefin aqueous polymer dispersion coating layer between the single polyolefin aqueous polymer dispersion barrier layer and the first major side of the cellulosic substrate, wherein the at least one non-polyolefin aqueous polymer dispersion basecoat layer comprises a non-polyolefin binder and a pigment, wherein a binder-to-pigment ratio of the at least one non-polyolefin aqueous polymer dispersion basecoat layer is between 1:20 to 1:2, wherein the at least one non-polyolefin aqueous polymer dispersion coating layer comprises a non-polyolefin binder, wherein the non-polyolefin binder comprises a blend of soft binder having a glass transition temperature of less than 25° C. and hard binder having a glass transition temperature of more than 25° C.

2. The cellulosic structure of claim 1, wherein the cellulosic substrate comprises paperboard.

3. The cellulosic structure of claim 1, wherein the cellulosic substrate comprises solid bleached sulfate paperboard.

4. The cellulosic structure of claim 1, wherein polyolefin binder comprises at least one of polyethylene (PE) or polypropylene (PP).

5. The cellulosic structure of claim 1, wherein the binder-to-pigment ratio of the single polyolefin aqueous polymer dispersion barrier layer is between 1:1.5 and 12:1.

6. The cellulosic structure of claim 1, wherein the binder-to-pigment ratio of the single polyolefin aqueous polymer dispersion barrier layer is between 1:1 and 8:1.

7. The cellulosic structure of claim 1, wherein the non-polyolefin binder comprises at least one of styrene acrylic, styrene-butadiene, vinyl acrylic, polyester, and polyvinyl alcohol.

8. The cellulosic structure of claim 1, wherein the non-polyolefin binder comprises styrene acrylic.

9. The cellulosic structure of claim 1, wherein the binder-to-pigment ratio of the at least one non-polyolefin aqueous polymer dispersion basecoat layer is between 1:10 to 1:2.5.

10. The cellulosic structure of claim 1, wherein the binder-to-pigment ratio of the at least one non-polyolefin aqueous polymer dispersion basecoat layer is between 1:5 to 1:3.

11. The cellulosic structure of claim 1, wherein the calcium carbonate content in the pigment is less than 1% by weight.

12. The cellulosic structure of claim 1 having a 30-minute-water-Cobb rating of at most about 20 g/m$^2$.

13. The cellulosic structure of claim 1 having a water vapor transmission rate of less than 500 grams per square meter per day at 38° C./90% RH.

14. The cellulosic structure of claim 1 having a 3M kit test value is at least 7.

15. The cellulosic structure of claim 1 having a blocking rating of 2.0 or less.

16. The cellulosic structure of 1, wherein the cellulosic structure is repulpable to an extent that after repulping a percentage of accepts is at least 50%.

17. A container comprising the cellulosic structure of claim 1.

18. The container of claim 17 in the form of a cup.

19. A method for manufacturing a cellulosic structure, the method comprising:

providing a cellulosic substrate comprising a first major side and a second major side opposed from the first major side;

applying at least one non-polyolefin aqueous polymer dispersion coating layer on the first major side of a cellulosic substrate, wherein the at least one non-polyolefin aqueous polymer dispersion basecoat layer comprises a non-polyolefin binder and a pigment, wherein a binder-to-pigment ratio of the at least one non-polyolefin aqueous polymer dispersion basecoat layer is between 1:20 to 1:2, wherein the at least one non-polyolefin aqueous polymer dispersion coating layer comprises a non-polyolefin binder, wherein the non-polyolefin binder comprises a blend of soft binder having a glass transition temperature of less than 25° C. and hard binder having a glass transition temperature of more than 25° C.; and applying a single polyolefin aqueous polymer dispersion barrier layer on the at least one non-polyolefin aqueous polymer dispersion coating layer, wherein the single polyolefin aqueous polymer dispersion barrier layer comprises a polyolefin binder and a pigment, wherein a binder-to-pigment ratio of the single polyolefin aqueous polymer dispersion barrier layer is between 1:2 to 20:1, wherein a calcium carbonate content in the pigment is less than 2% by weight.

20. The method of claim 19 further comprising forming a cup from the coated cellulosic substrate.

* * * * *